Sept. 12, 1967    J. KÄGI    3,341,421
NUCLEAR REACTOR PLANT HAVING LEAK DETECTION CONTROL SYSTEM
Filed March 16, 1964    2 Sheets-Sheet 1

Inventor:
Jakob Kägi
By K. A. May.
Attorney

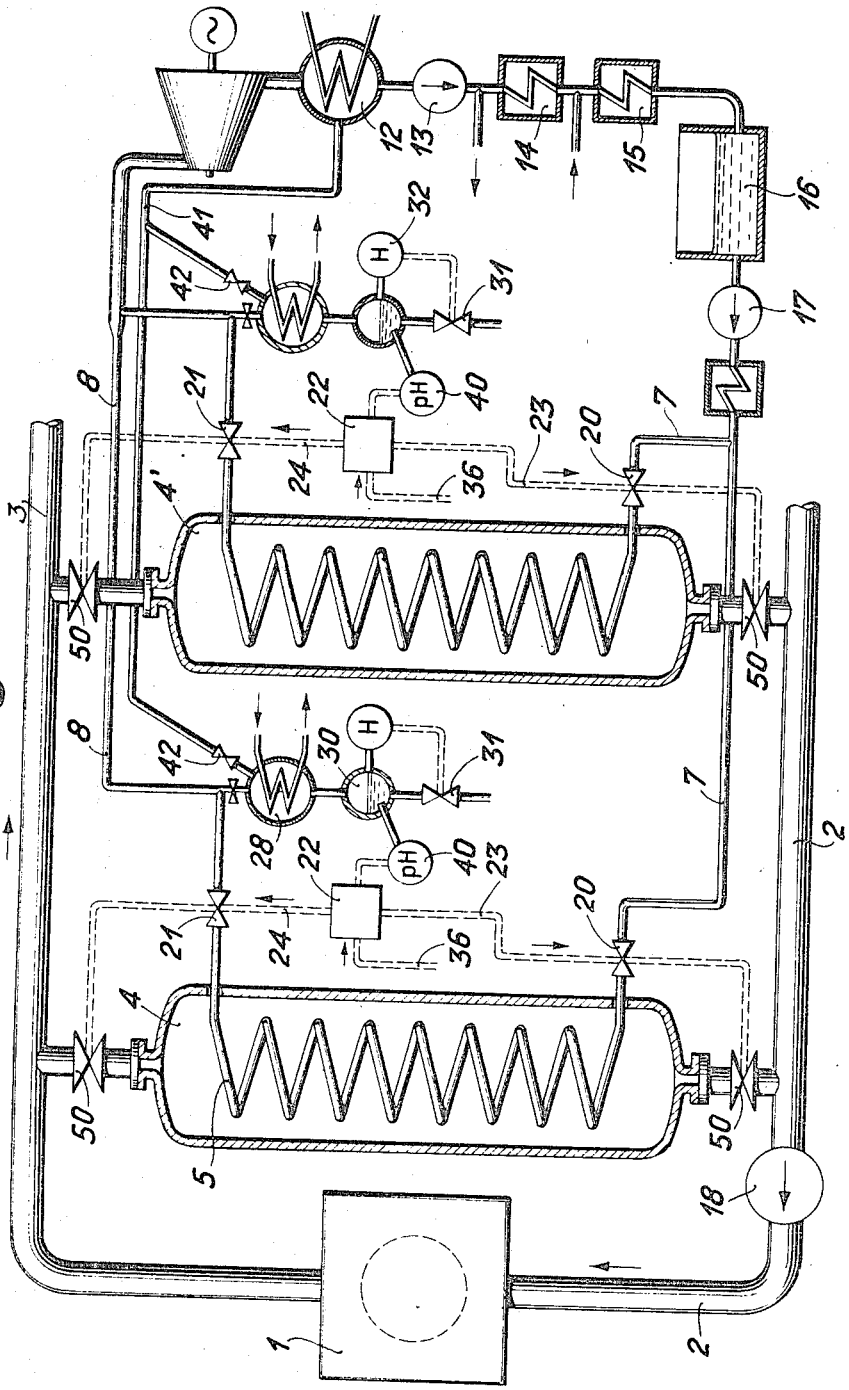

United States Patent Office 3,341,421
Patented Sept. 12, 1967

3,341,421
NUCLEAR REACTOR PLANT HAVING LEAK DETECTION CONTROL SYSTEM
Jakob Kägi, Winterthur, Switzerland, assignor to Sulzer Brothers Limited, Winterthur, Switzerland, a corporation of Switzerland
Filed Mar. 16, 1964, Ser. No. 352,258
Claims priority, application Switzerland, Mar. 20, 1963, 3,563/63
5 Claims. (Cl. 176—20)

The invention relates to a nuclear reactor plant in which heat from the reactor is yielded to a working medium via a heat exchanger by means of a gaseous heat carrier, the latter having a higher pressure, at least in the heat exchanger, than the working medium.

In nuclear reactor plants including heat exchangers there is usually the risk of a leak in heat exchanger. This danger is particularly pronounced in plants having a gaseous heat carrier at a higher pressure than the working medium. In such a case there is a danger of the heat carrier passing over into the circuit of the working medium and in some cases there is a possibility that the heat carrier escapes to the outside of said circuit, for example through turbine seals. Such escape of heat carrier must be counteracted with every means, because of the danger of radioactive contamination of the working medium circuit and of the surroundings of the reactor plant.

An object of the invention is the provision of means, in a nuclear reactor plant including a heat exchanger, which means afford immediate detection of a leak in the heat exchanger and also immediate disconnection of the leaky part of the heat exchange surfaces without any appreciable impairment to the operation of the plant. To accomplish this the heat exchanger is divided into a plurality of heat exchangers arranged in parallel relation in the heat carrier circuit as well as in the circuit of the working medium, the individual heat exchangers being separable at least from the working medium circuit by special shut-off means, and a detector is connected, at least periodically, to each of the heat exchangers in order to detect any presence of heat carrier in the working medium.

If the heat carrier is a gas and the working medium is a vaporizable liquid vaporized in the heat exchangers, a portion of the vapor leaving the heat exchangers may be condensed in a condenser provided with a vacuum pump. The pressure maintained by this pump is an indication of the gas content of the vapor in the condenser.

If the heat carrier is carbon dioxide and the working medium is water which is vaporized in the heat exchangers, a portion of the vapor leaving the heat exchangers may be condensed and the concentration of hydrogen ions in the condensate may be measured for detecting leakage from the heat carrier circuit into the working medium circuit.

The novel features which are considered characteristic of the invention are set forth with particularity in the appended claims. The invention itself, however, and additional objects and advantages thereof will best be understood from the following description of embodiments thereof when read in connection with the accompanying drawing wherein:

FIG. 2 is a schematic layout of a modified plant according to the invention.

Figure 1:
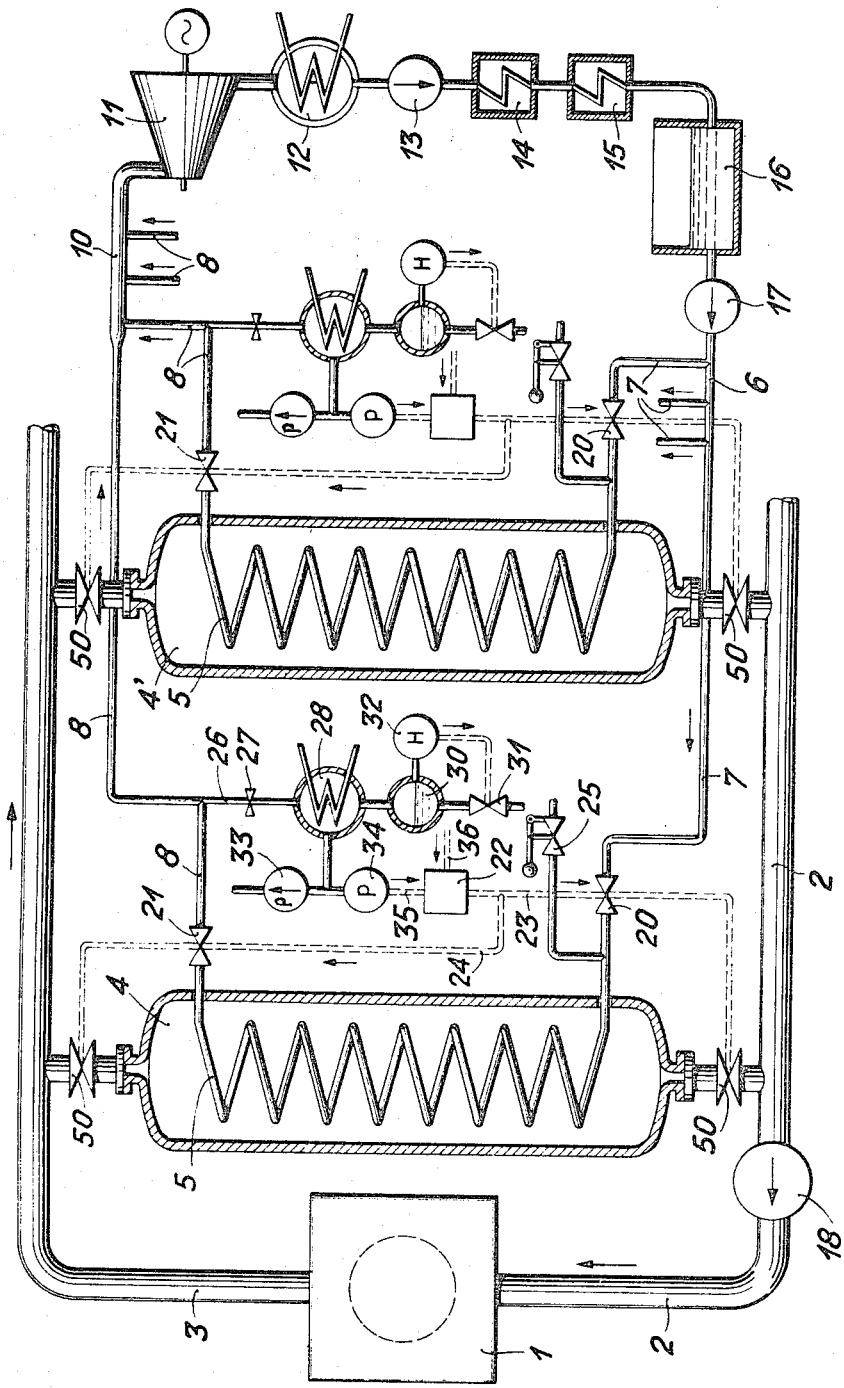
FIG. 1 is a schematic layout of a plant according to the invention.

Referring more particularly to FIG. 1, a gaseous heat carrier, for example carbon dioxide, is fed to a nuclear reactor 1 through a pipe 2 and is removed through a pipe 3 from the reactor after heating therein. Pressure vessels 4, 4′ of heat exchangers are arranged between the pipes 2 and 3 and contain tube coils 5. For reasons of clarity, only two heat exchangers are shown in the drawing, although a plant according to the invention contains a larger number, for example, four. Like parts of the heat exchangers and element associated therewith are designated by like numerals. A circulating blower 18 may be provided in the common part of the pipe 2 to circulate the heat carrier.

The cooled working medium, for example feedwater, is fed to the coils 5 through a pipe 6, from which pipes 7 branch to the various heat exchangers. The working medium leaves the heat exchangers through pipes 8 terminating in a common pipe 10 which conducts the working medium to a turbine 11. From the latter the working medium flows to a condenser 12 from which it is drawn by a condensate pump 13 and is fed to a feed tank 16 through preheaters 14, 15. The working medium is drawn from the feed tank 16 by a feed pump 17 and delivered to the pipe 6.

Each pipe 7 contains a shut-off valve 20 and each pipe 8 a shut-off valve 21. These elements are used to separate the respective coils 5 from the working medium circuit and are operated for this purpose by control elements 22 via signal lines 23, 24. A safety valve 25 is connected to the pipe 7 between the shut-off element 20 and the heat exchanger.

A pipe 26 provided with a throttle means 27 branches from each pipe 8 and is connected to a condenser 28. The condensate is discharged from the condenser into a container 30 wherefrom the condensate is drained through a valve 31 which is actuated in the conventional manner by a liquid level regulator 32 in dependence on the level of liquid in the container 30. The mixture of gas and vapor accumulating in the condenser 28 is drawn off by a vacuum pump 33. A pressure-sensitive element 34 measures the pressure in the condenser 28 and emits a corresponding signal through a signal line 35 to the control device 22. A signal corresponding to the maximal permissible pressure is fed to the control device 22 through a signal line 36. This desired pressure or set point value may be variable and must be higher, for example, when starting the plant and the entire system is full of air, than during operation, when the detector effect according to the invention takes place.

During operation of the plant the gaseous heat carrier is circulated by the circulating blower 18. It flows through the reactor 1, and then through the heat exchangers 4, 4′ in parallel relation, where it yields heat to the working medium. The cooled heat carrier flows into the pipe 2. The working medium is pumped into the coils 5 by the feed pump 17, is evaporated in said coils by the heat received from the heat carrier, and flows through the pipes 8, 10 to the turbine 11 where it performs mechanical work. On leaving the turbine the working medium flows in known manner through the condenser, condensate pump and preheaters 14, 15 to the feed tank 16, from which it flows to the feed pump 17.

Some of the working medium vapor flowing through each pipe 8 is diverted through the pipe 26 to the condenser 28, where the vapor condenses. The quantity of diverted vapor is determined by the throttle means 27 and the pressure prevailing in the condenser 28. If the vapor is free of gas there is a fixed relation between the pressure in the condenser and the temperature of the vapor, the pressure being the saturated vapor pressure. Since the quantity of gas delivered per time unit by a vacuum pump is a function of the intake pressure, the pressure in the condenser becomes stabilized at a value which is an indication of the gas content of the working medium. The pressure in the condenser is sensed by the pressure-sensitive element 34 and is continuously compared in the element 22 with the permissible pressure represented by the signal coming from the signal line 36. If the sensed pressure exceeds the permissible pressure, as is the case if there is a leak, the control element 22 causes closing of the valves 20 and 21, thus separating the respective heat exchanger from the working medium circuit. In the event of a pressure rise in the shut-off part beyond the permissible pressure, the safety valve 25 comes into operation.

The arrangement according to the invention affords immediate detection of leakage of heat carrier gas into the working medium circuit. Since the total heat exchange surface is divided into a number of independent heat exchangers, an individual heat exchanger in which a leak is detected can immediately be separated from the circuit without any difficulty. In this way escape of heat carrier gas into the working medium circuit and therefrom into the environment of the reactor plant can be prevented.

FIG. 2 wherein like parts are designated by like numerals as in FIG. 1, shows another embodiment of the invention. The embodiment according to FIG. 2 differs essentially from that shown in FIG. 1 in that the pressure-sensitive element 34 is replaced by a device 40 for measuring the hydrogen ion concentration (pH) in the condensate. In contradistinction to the arrangement shown in FIG. 1, extraction from the condenser is not effected by separate pumps 33 but by the condenser 12 of the turbine plant to which the condensers 28 are connected by pipes 41 containing throttle valves 42.

Similarly to the arrangement according to FIG. 1, a control device 22 compares the value measured by the device 40 with a predetermined limit value and operates the shut-off valves 20, 21 if the measured value exceeds the limit value represented by a signal arriving through conduit 36.

The arrangement according to FIG. 2 is particularly suitable for plants in which the reactor coolant is carbon dioxide ($CO_2$) and the working medium is water. As carbon dioxide enters the water, carbonic acid forms and is detected by the device 40.

It is not absolutely essential that each of the heat exchangers 4, 4', etc., has its own detector to detect the presence of reactor coolant in the working medium. An alternative arrangement employs a central detector which is connected momentarily, for example periodically, to the individual pipes conducting the working medium from the heat exchangers.

The pipes connecting the reactor coolant pipes 2 and 3 to the vessels 4, 4', etc., may be provided with shut-off elements 50 to separate the heat exchangers from the coolant circuit. The shut-off elements 50 may be operated simultaneously with the respective shut-off elements 20 and 21 by the control elements 22 in the manner indicated in FIGS. 1 and 2.

I claim:
1. A nuclear reactor plant comprising:
a nuclear reactor,
a plurality of heat exchangers,
a heat carrier medium,
means for consecutively passing said heat carrier medium as a coolant through said reactor and as a heating agent in the gas state in parallel relation through said heat exchangers,
a working medium,
means for passing said working medium as a coolant in parallel relation through said heat exchangers for receiving heat from said heat carrier medium, the pressure of said heat carrier medium, at least in said heat exchangers, being higher than the pressure of said working medium,
said means for passing said working medium through said heat exchangers comprising an inlet pipe and an outlet pipe for each heat exchanger,
separate conduits individually connected to said outlet pipes for tapping working medium therefrom,
separate detector means individually connected to said conduits for separately detecting the presence of heat carrier medium in the working medium tapped from said outlet pipes,
means individually connected to said conduits for feeding a predetermined rate of flow of working medium therethrough to said detector means, and
shut-off means individually connected to said outlet pipes and to said inlet pipes for individually preventing passage of working medium through the heat exchangers when heat carrier medium has been detected by said detector means in the working medium passed through the respective heat exchanger.

2. A nuclear reactor plant according to claim 1 wherein each of said means for feeding the predetermined rate of flow of working medium through said conduits comprises throttling means individually interposed in said conduits, and suction means arranged downstream of said throttling means for withdrawing working medium therefrom.

3. A nuclear reactor plant comprising:
a nuclear reactor,
a plurality of heat exchangers,
a heat carrier medium,
means for consecutively passing said heat carrier medium as a coolant through said reactor and as a heating agent in parallel relation through said heat exchangers,
a working medium,
means for passing said working medium in the form of a vaporizable liquid as a coolant in parallel relation through said heat exchangers for vaporizing said working medium, the pressure of said heat carrier medium in said heat exchangers being higher than the pressure of said working medium in said heat exchangers,
said means for passing said working medium through said heat exchangers comprising an inlet pipe and an outlet pipe for each heat exchanger,
separate conduits individually connected to said outlet pipes for tapping vapor therefrom,
separate condensers individually connected to said conduits for separately condensing the tapped vapors,
detector means operatively connected to said condensers for separately detecting the presence of heat carrier medium in the vapors tapped through said conduits, and
shut-off means individually connected to said outlet pipes and to said inlet pipes for individually preventing passage of working medium through the heat exchangers in the tapped vapor of which heat carrier medium has been detected by said detector means.

4. A nuclear reactor plant as defined in claim 3 wherein said detector means comprises a pressure sensitive means individually connected to said condensers for sensing the pressure therein.

5. A nuclear reactor plant as defined in claim 3 wherein said heat carrier medium is carbon dioxide, said working medium is water, and said detector means individually include means for separately measuring the concentration of hydrogen ions in the separately condensed tapped vapors.

References Cited

UNITED STATES PATENTS 2,658,728  11/1953  Evans _____ 165—70

FOREIGN PATENTS 748,264  4/1956  Great Britain.
837,786  5/1960  Great Britain.
931,608  7/1963  Great Britain.

L. DEWAYNE RUTLEDGE, *Primary Examiner.*